UNITED STATES PATENT OFFICE.

HENRY LEE CARTER, OF NEW YORK, N. Y.

ELASTIC PLASTER.

SPECIFICATION forming part of Letters Patent No. 695,031, dated March 11, 1902.

Application filed July 24, 1901. Serial No. 69,589. (Specimens.)

*To all whom it may concern:*

Be it known that I, HENRY LEE CARTER, a citizen of the United States, and a resident of the borough of Manhattan, in the city and county of New York and State of New York, have invented certain new and useful Improvements in Elastic Plasters, of which the following is a specification.

My invention relates to the process of manufacturing elastic plaster for walls, ceilings, pottery use, and the like and for use in the fine arts, for molding into statuary, and for any other purposes to which any plasters are applicable.

By means of my invention I obtain a truly elastic plaster, one that is more adhesive and tenacious than those commonly in use and admirably adapted to withstand strains without cracking or buckling. It may be directly applied to lath, stone, brick, or even smoother surfaces. The simplicity of its manufacture and at practically the same cost as ordinary and plain calcined plasters makes it most desirable, in addition to its elastic qualities.

My plaster may be used in the same way as all grades of calcined plaster now in use; but the fact that it can be used as before stated permits saving of expense in its use or application. For wall use in buildings the troublesome mixing of mortar, sand, lime, &c., may be entirely dispensed with. On account of the flexible and elastic nature of my product a building may settle unevenly without cracking the plaster.

The invention relates, further and more especially, to the product obtained by my process.

The first step in the process of manufacturing the product consists in calcining the natural gypsum-rock or its equivalents—as lime, marble-dust, and the like—by the usual methods. The next step consists in subjecting the calcined substance to the operation of screening or bolting, reducing the substance to a fine powder, and obtaining an impalpable powder. The calcined plaster is thoroughly mixed with althæa, commonly known as "marshmallow-root," and dextrine. In place of the althæa any of its equivalents, as just herein-below noted, may be employed—viz., althæo leaves or flowers, *Althæa rosea*, *Malva sylvestris*, *Malva vulgaris*, *Malva rotundifolia*, *Hibiscus esculentus*, *Hibiscus abelmoschus*, *Hibiscus sabdariffa*, *Hibiscus rosa-sineusis*, *Abutilon avicennæ*. The ingredients are placed in a mixer, mortar, or any vessel or piece of machinery, whereby a mixing results equivalent to trituration.

The manner of using my compound (elastic plaster) is the same as that employed with any and all ordinary plasters—namely, by adding water to the desired proportion just before application to obtain the requisite consistency.

Care should be taken to mix together proper proportions of the ingredients, although my invention is not limited to a mere matter of proportion. For good results there may be two thousand pounds of calcined gypsum or calcic sulfate, six pounds of althæa or marshmallow-root, and six pounds of dextrine, or their equivalents.

I sometimes add a small portion of gelatin to the mixture.

I have found by numerous experiments that althæa and dextrine exert positive and negative effects on the calcined gypsum, the althæa retarding and the dextrine hastening the setting, and these opposing effects enables me to easily combine the ingredients to obtain a plaster which will set in a predetermined interval of time, and both have to be present to obtain my product.

Having described my invention, I desire to secure by United States Letters Patent and claim—

1. A plaster consisting of a mixture of a base of calcined gypsum, althæa, and dextrine.

2. A plaster consisting of a mixture of a base of calcined gypsum, althæa, dextrine and gelatin.

3. A plaster consisting of a mixture of a base of calcined gypsum, in the proportion of about two thousand parts by weight, althæa and dextrine about six parts each.

4. A plaster, consisting of a mixture of a base of calcined gypsum in the proportion of about two thousand parts by weight, and small quantities of althæa, dextrine and gelatin.

Signed at New York, in the county of New York and State of New York, this 20th day of July, A. D. 1901.

HENRY LEE CARTER. [L. S.]

Witnesses:
W. A. EBSEN,
ALBERT E. HAWS.